US010597284B2

(12) United States Patent
Ballard et al.

(10) Patent No.: US 10,597,284 B2
(45) Date of Patent: Mar. 24, 2020

(54) FUEL TANK VENT AND SHUTOFF VALVE

(71) Applicant: Flomax International, Inc., Springville, UT (US)

(72) Inventors: Mark Paul Ballard, Pleasant Grove, UT (US); Carl Paul Ballard, Lindon, UT (US); John Trent Kendrick, Mapleton, UT (US)

(73) Assignee: Flomax International, Inc., Springville, UT (US)

( * ) Notice: Subject to any disclaimer, the term of this patent is extended or adjusted under 35 U.S.C. 154(b) by 106 days.

(21) Appl. No.: 14/509,972

(22) Filed: Oct. 8, 2014

(65) Prior Publication Data

US 2015/0096648 A1 Apr. 9, 2015

Related U.S. Application Data

(60) Provisional application No. 61/888,379, filed on Oct. 8, 2013.

(51) Int. Cl.
*B67D 7/36* (2010.01)
*B60K 15/035* (2006.01)
(Continued)

(52) U.S. Cl.
CPC ........ *B67D 7/367* (2013.01); *B60K 15/03519* (2013.01); *F16K 1/123* (2013.01);
(Continued)

(58) Field of Classification Search
CPC ........... B67D 7/367; B67D 7/04; F16K 1/123; F16K 1/126; B60K 15/03519;
(Continued)

(56) References Cited

U.S. PATENT DOCUMENTS 2,912,000 A * 11/1959 Green ................... F16K 15/063
137/515.5
2,912,001 A * 11/1959 Green ................... F16K 15/063
137/516.29

(Continued)

OTHER PUBLICATIONS

PCT/US2014/059757, International Search Report and Written Opinion, dated Mar. 12, 2015.

*Primary Examiner* — Timothy L Maust
*Assistant Examiner* — James R Hakomaki
(74) *Attorney, Agent, or Firm* — Kunzler Bean & Adamson, PC

(57) ABSTRACT

A non-pressure valve is provided, and includes a tubular housing having an inlet and an outlet. The tubular housing forms a fluid flow path. The non-pressure valve also includes a sliding sleeve coupled with the outlet, a spring disposed between the sliding sleeve and the tubular housing, and a flow-through mount disposed within the tubular housing adjacent the sliding sleeve. The flow-through mount is coupled with a bulb. The bulb is configured to engage the sliding sleeve and impede the flow of fuel. The non-pressure valve also includes a hose fluidly coupling the non-pressure valve with a remote fuel vent. The flow-through mount may include a plurality of bypass openings positioned in the fluid flow path and configured to divert a portion of the fuel flow through a hose to the remote fuel vent.

8 Claims, 4 Drawing Sheets

(51) Int. Cl.
  *F16K 1/12*   (2006.01)
  *B60K 15/03*  (2006.01)
  *B67D 7/04*   (2010.01)
  *B60K 15/04*  (2006.01)

(52) U.S. Cl.
  CPC .............. *F16K 1/126* (2013.01); *B60K 15/04* (2013.01); *B60K 2015/03368* (2013.01); *B60K 2015/047* (2013.01); *B60K 2015/0461* (2013.01); *B60K 2015/0477* (2013.01); *B67D 7/04* (2013.01); *Y10T 137/7426* (2015.04)

(58) Field of Classification Search
  CPC .......... B60K 15/04; B60K 2015/03368; B60K 2015/0461; B60K 2015/047; B60K 2015/0477; Y10T 137/7426
  USPC .......... 137/219, 393, 614.5, 116.6, 508, 220, 137/116.5, 196, 198, 430; 141/196, 198, 141/212
  See application file for complete search history.

(56) References Cited

U.S. PATENT DOCUMENTS

| | | | | |
|---|---|---|---|---|
| 3,094,306 | A * | 6/1963 | Conrad | E21B 34/12 251/282 |
| 3,113,583 | A * | 12/1963 | Foz | F16K 17/105 137/220 |
| 3,174,503 | A * | 3/1965 | Absolon | F16K 21/18 137/393 |
| 3,590,847 | A * | 7/1971 | Worden | F16K 1/123 137/116.5 |
| 3,633,608 | A * | 1/1972 | Minkner | F16K 31/1226 137/220 |
| 4,077,425 | A * | 3/1978 | Drori | F16K 31/363 137/219 |
| 4,416,301 | A * | 11/1983 | Brumm | F16K 1/123 137/220 |
| 5,285,812 | A * | 2/1994 | Morales | F15C 1/14 137/386 |
| 5,715,857 | A * | 2/1998 | Gill | F16K 1/126 137/219 |
| 6,145,532 | A | 11/2000 | Tuckey et al. | |
| 6,216,721 | B1 * | 4/2001 | Perez | F16K 1/126 137/219 |
| 7,258,139 | B2 * | 8/2007 | Perusek | F15B 13/0814 137/884 |
| 7,757,709 | B2 * | 7/2010 | Cortez | B60K 15/035 137/386 |
| 9,676,605 | B2 * | 6/2017 | Porcile | B67D 7/68 |
| 2003/0131888 | A1 | 7/2003 | Cortez et al. | |
| 2004/0149333 | A1 | 8/2004 | Johansen | |
| 2004/0183044 | A1 * | 9/2004 | Wears | F16K 47/04 251/206 |
| 2005/0166966 | A1 | 8/2005 | Cortez | |
| 2011/0272046 | A1 | 10/2011 | Peattie et al. | |
| 2014/0261884 | A1 * | 9/2014 | Quang | B67D 7/465 141/196 |

\* cited by examiner

FUEL TANK VENT AND SHUTOFF VALVE

CROSS-REFERENCES TO RELATED APPLICATIONS

This application claims the benefit of and claims priority to U.S. Provisional Patent Application No. 61/888,379 entitled "FUEL TANK VENT AND SHUTOFF VALVE" and filed on Oct. 8, 2013 for Mark Paul Ballard et al., which is incorporated herein by reference.

FIELD

This disclosure relates to fluid transfer devices, and more particularly to a fluid receiver and fuel tank vent for receiving fluid from a nozzle.

BACKGROUND

Fuel receivers for receiving fuel from a fuel source are used for refueling large pieces of equipment, such as construction and mining vehicles, on-site using a mobile refueling source, such as a refueling truck. Generally, the fuel receivers are secured to the equipment in fluid communication with a fuel tank of the equipment. A fuel source includes a hose and a nozzle attached to an end of the hose. When fueling or refueling of the equipment is desired, the nozzle is placed securely over the receiver, a valve of the receiver is opened, and fuel is pumped from the fuel source, through the hose, nozzle, and receiver, to the fuel tank of the equipment. Such receiver and nozzle refueling systems are designed to facilitate efficient and rapid refueling events, that is, attachment of the nozzle, transmission of fuel into the fuel tank, and detachment of the nozzle.

Oftentimes, the fuel tank of large industrial equipment is very large, capable of holding hundreds of gallons of fuel. To efficiently fill such fuel tanks, transfer rates are in the range of 1 to 5 gallons per second. However, determining when to stop the fuel transfer rate so as to not overfill the tank is problematic. Current fuel receivers may take up to 3-5 seconds to stop the flow of fuel, at which time an extra 35 gallons may have flown into the tank.

SUMMARY

An apparatus for a non-pressure valve assembly is disclosed. In one embodiment, the apparatus includes a tubular housing having an inlet and an outlet. The tubular housing forms a fluid flow path. The non-pressure valve also includes a sliding sleeve coupled with the outlet, a spring disposed between the sliding sleeve and the tubular housing, and a flow-through mount disposed within the tubular housing adjacent the sliding sleeve. The flow-through mount is coupled with a bulb. The bulb is configured to engage the sliding sleeve and impede the flow of fuel. The non-pressure valve also includes a hose fluidly coupling the non-pressure valve with a remote fuel vent. The flow-through mount may include a plurality of bypass openings positioned in the fluid flow path and configured to divert a portion of the fuel flow through a hose to the remote fuel vent.

In one embodiment, the bulb is coupled with a hydrodynamically optimized entry cone. Additionally, the sliding sleeve moves, relative to the outlet, between a closed position and an open position, and the sliding sleeve comprises a shoulder configured to engage a cutout portion of the tubular housing when the sliding sleeve is in the open position. In one embodiment, the sliding sleeve slides from the open position to the closed position in response to detecting an increase in backpressure in the hose. The backpressure in the hose may cause a fluid to exert a force on the shoulder and start a transition from the open position to the closed position.

In one embodiment, the apparatus also includes a fluid receiver mount configured for receiving a fluid receiver that is capable of coupling with a fluid nozzle. In another embodiment, each of the plurality of bypass openings may be fluidly coupled with a bypass channel formed in the tubular housing, where the bypass channel is fluidly coupled with the hose. Additionally, each of the bypass openings may be positioned at an equal radial distance from a center of the flow-through mount. In another embodiment, the apparatus includes a shutoff channel fluidly coupling the bypass channel with a cavity formed by a shoulder of the sliding sleeve and the tubular housing.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

The subject matter of the present application has been developed in response to the present state of the art, and in particular, in response to the problems and needs in the art that have not yet been fully solved by currently available non-pressure valves. Accordingly, the subject matter of the present application has been developed to provide a non-pressure valve that overcomes at least some shortcomings of the prior art.

Described herein are various embodiments of a fueling system capable of automatic shutoff once a predetermined fuel level has been reached inside of a fuel tank. The fueling system, beneficially, reduces the risk of under filling and overfilling, and accordingly, reduces the likelihood of fuel spillage. The fuel system allows for rapid filling of non-pressurized fuel tanks by fluidly connecting a non-pressure fuel shutoff valve (hereinafter "non-pressure valve") and a non-pressure vent. The non-pressure valve is formed having a substantially annular flow path around a hydrodynamically optimized entry cone that allows for non-turbulent high fuel flow rates into the fuel tank. A portion of the fuel is diverted through a hose to the vent, then through a float tube connected with a bell and poppet, and into the fuel tank. A float attached with the bell detects when the fuel reaches a predetermined fill level and causes a change in the annular flow path between the bell and the poppet. Any change in the annular flow path results in the poppet forming a seal with the bell, and consequently, the backpressure in the hose causes the non-pressure valve to close, as will be described below in greater detail.

Figure 1:
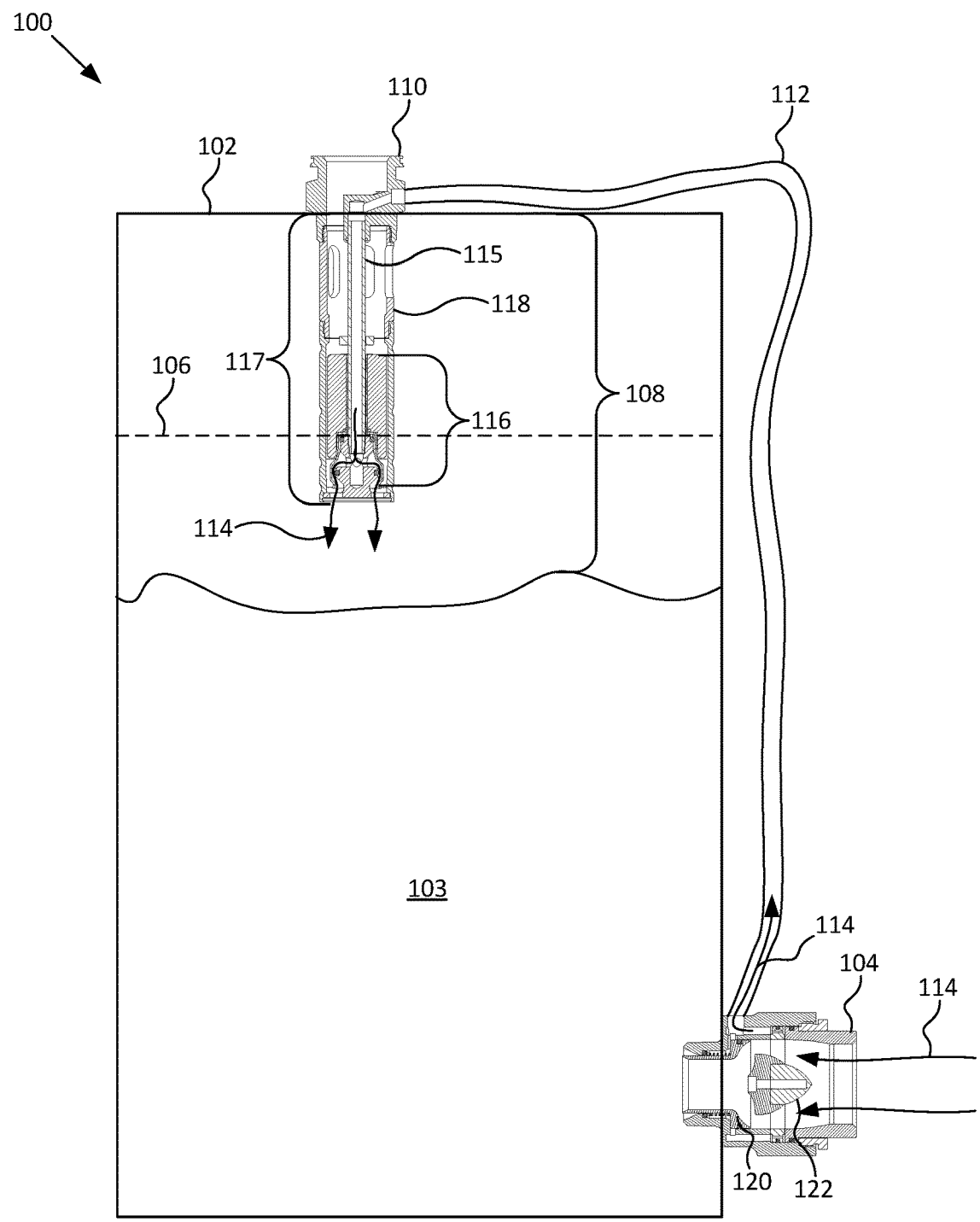
FIG. 1 is a schematic diagram illustrating one embodiment of a fuel system 100 in accordance with embodiments of the invention.

FIG. 1 is a schematic diagram illustrating one embodiment of a fuel system 100 in accordance with embodiments of the invention. The fuel system 100, as depicted, includes a fuel tank 102 that receives fuel 103 through a non-pressure valve 104. A fuel receiver (not shown) may be connected to the non-pressure valve 104 for receiving fuel from a fuel nozzle. The non-pressure valve 104 is configured to shutoff fuel flow when the fuel level reaches a predetermined fill level 106. The predetermined fill level 106 is selected according to the size of the fuel tank 102 (i.e., dimensions of the fuel tank 102). The unused area of the fuel tank 102 is known as "ullage." In other words, the area between the fuel and the top of the fuel tank is the ullage 108. The ullage 108 is predetermined to allow the fuel 103 sufficient room to expand and contract without overfilling the fuel tank 102. Previously, the amount of ullage 108 required had to take into account the amount of time required to stop flow through a shutoff valve. Current shutoff valves may take up to 1-3 seconds to completely stop fuel flow, which, at high flow rates, may be equivalent to an extra 5-35 gallons of fuel. Beneficially, the described fuel system 100 is capable of substantially instantaneous shutoff of fuel flow. As such, a smaller ullage 108 is required, and more precise filling is accomplished.

A vent 110 allows for the breathing of the fuel tank 102. The vent 110 allows the air of the ullage 108 to escape the fuel tank 102 as fuel 103 fills the tank. As described above, the vent 110 is also fluidly coupled via a hose 112 with the non-pressure valve 104 and configured to cause the non-pressure valve 104 to shutoff fuel flow. While the components of the non-pressure valve 104 and the vent 110 will be described in greater detail below, the method of operation includes diverting a portion of the fuel 103 into the hose 112 and subsequently into the vent 110. The direction of this diverted portion of fuel is depicted in FIG. 1 by arrows 114. The fuel flows 114 through a float tube 115 in the vent and into a float assembly 116. The float assembly 116 is housed in a float shaft 118 that extends into the fuel tank 102. The length 117 of the float shaft 118 is determined by the desired fill level 106. Stated differently, a longer float shaft 118 results in a larger ullage 108 as compared to a shorter float shaft 118.

When the fuel 103 reaches the float assembly 116, and causes the float assembly 116 to move upward, the fuel flow through the vent 110 is impeded and the fuel pressure in the hose 112 increases. The increase in pressure in the hose 112 is communicated with the non-pressure valve 104 which pushes a sleeve 120 that engages a bulb 122 and consequently stops the flow of fuel through the non-pressure valve 104.

Figure 2A:
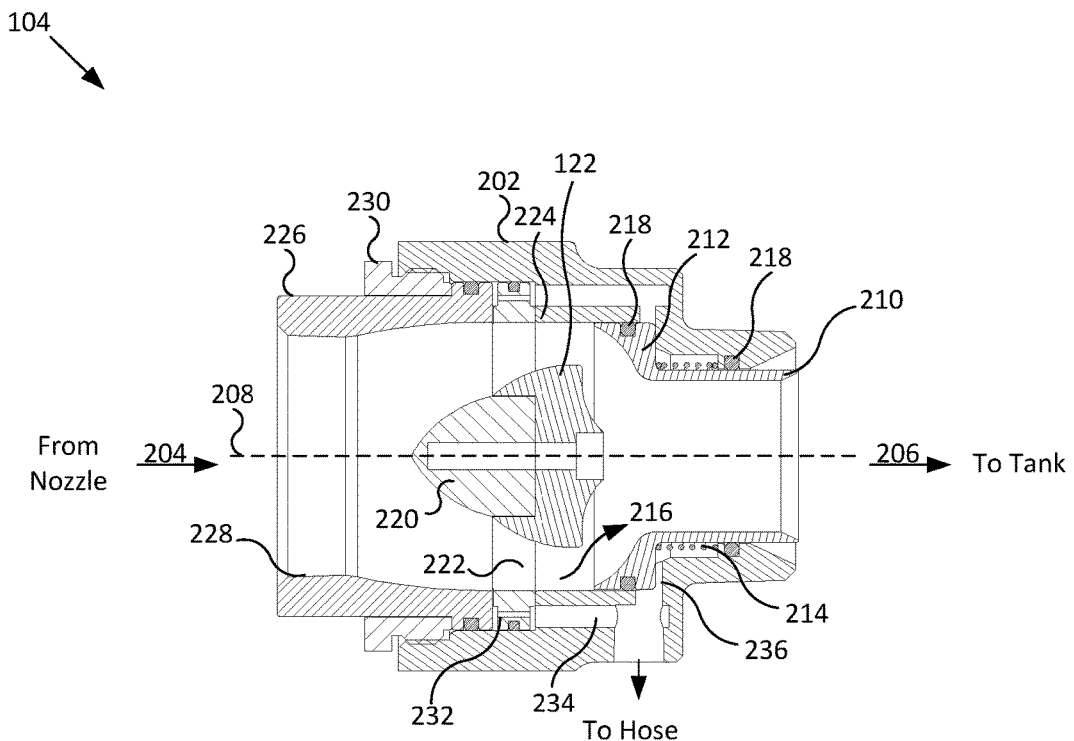
FIGS. 2a and 2b are schematic cross-sectional view diagrams illustrating embodiments of the non-pressure valve in accordance with embodiments of the invention.
Figure 2B:
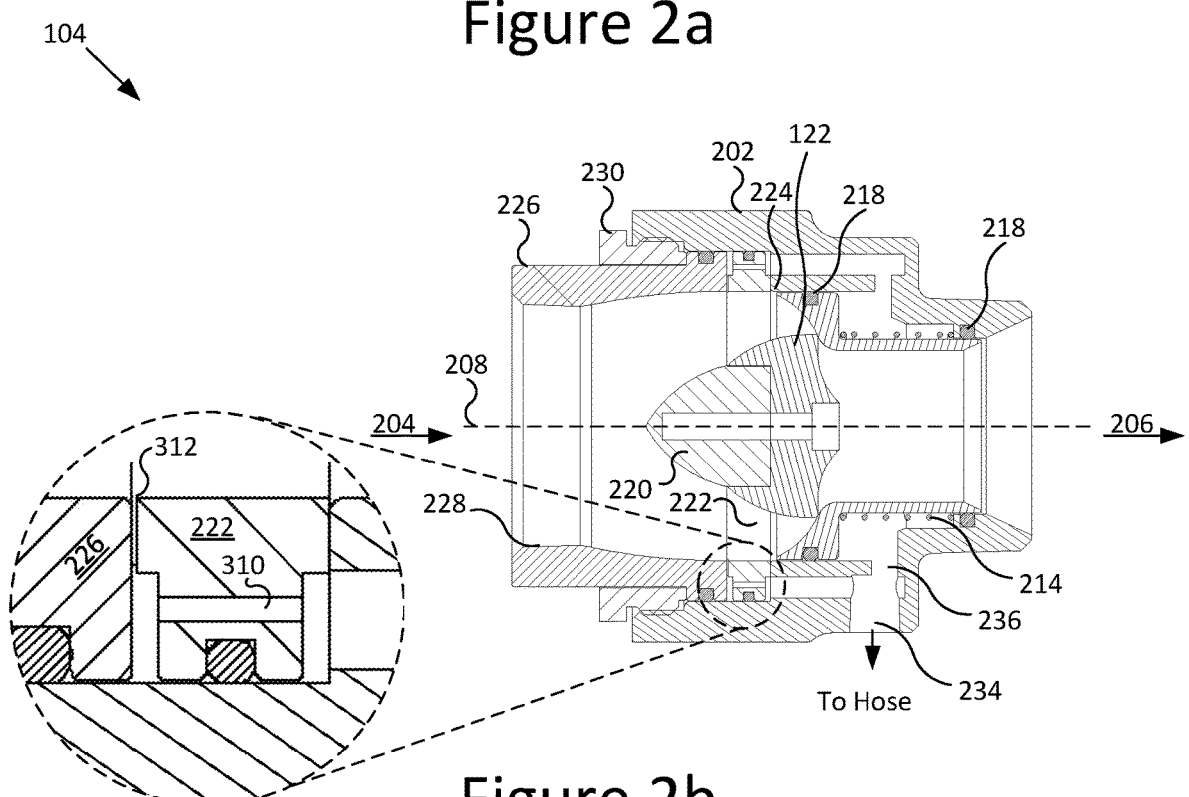

FIGS. 2a and 2b are schematic cross-sectional view diagrams illustrating embodiments of the non-pressure valve 104 in accordance with embodiments of the invention. The non-pressure valve 104 is configured to operate in one of at least two modes. The two modes, open mode and closed mode, are depicted in the FIGS. 2a and 2b, respectively. In a further embodiment, a partially open or closed mode is contemplated.

The non-pressure valve 104 is constructed with a housing 202. The housing 202, in one embodiment, is formed of a rigid material capable of withstanding the forces associated with rapidly flowing fuel. Examples of a rigid material suitable for use as the housing 202 include, but are not limited to, aircraft grade aluminum that may be anodized, or, nickel-plated steel. The housing 202 is generally formed in the shape of a tube, having first and second openings at opposite ends of the housing 202. The openings serve as an inlet 204, and an outlet 206 for fuel.

In one embodiment, the housing 202 forms a pathway, or a flow path, through which fuel or other liquids may flow. A cross-sectional profile of the flow path through the housing 202 is circular with different diameters at different points along a longitudinal axis, depicted by the dashed line 208. Disposed in the outlet 206 of the housing is a sliding sleeve 210. The sliding sleeve 210 is formed with an exterior diameter selected to slidingly mate with an interior surface of the outlet 206. A shoulder 212 formed in the sliding sleeve 210 abuts a corresponding cutout portion in the housing 202 when the sliding sleeve 210 is in an open position. As used herein, the phrase "open position" refers to an operating mode wherein fuel is allowed to flow. Similarly, the phrase "closed position" refers to an operating mode wherein the flow of fuel is impeded.

In one embodiment, a spring 214 is disposed between the sliding sleeve 210 and the housing 202. The spring 214, as depicted, is a compression or helical spring and is configured with a spring rate in the range of between about 0.5 and 25 psi. The spring rate of the spring 214 is selected to allow the flow of fuel from the inlet 204 to flow substantially unimpeded into the fuel tank. As backpressure at the inlet 204 typically causes a fuel nozzle to shut off, the sliding sleeve 210 is configured to slide from the default closed position to the open position with little force. As will be described in greater detail below, backpressure from fuel flow through the hose 112 pushes on the shoulder 212 and moves the sliding sleeve 210 from the open position to the closed position, thereby increasing the backpressure on the fuel nozzle.

The sliding sleeve 210, like the housing 202, has a generally tubular shape, with a circular cross-sectional profile. An inlet 216 of the sliding sleeve 210 may have a decreasing cross-sectional diameter as depicted. O-rings 218 may be embedded in the outer surface of the sliding sleeve 210 to form a seal between the housing and the sliding sleeve 210.

The sliding sleeve 210, as described, is configured to slide between a closed position and an open position. In the closed position (see FIG. 2b), the sliding sleeve 210 engages the bulb 122. The bulb 122 is disposed adjacent to an entry cone 220 and mounted in the center of a flow-through ring mount 222. The flow path through the housing 202 with the entry cone 220 and the bulb 122 is annular, with the entry cone 220 and the bulb 122 forming a venturi. As used herein, the term "venturi" refers to an area having a smaller diameter flow path as compared to an adjacent but upstream area, that causes the fluid flow velocity to increase and the pressure to decrease. The entry cone 220 is hydrodynamically optimized to reduce undue fluid drag. The entry cone 220 may have a cross-sectional profile resembling a pointed elliptical cone, as depicted. Other hydrodynamically optimized cross-sections are contemplated, including but not limited to, simple pointed cones, parabolic cones, spherically blunted ogive cones, bi-conic cones, etc. In other words, any cross-sectional profile of the entry cone 220 that reduces fluid drag, and does not introduce turbulence, may be implemented in the housing 202.

The flow-through ring mount 222 is formed, as will be described and depicted below with reference to FIG. 3, with a diameter that engages the inner surface of the housing 202. The flow-through ring mount 222 is disposed between a shoulder 224 of the housing 202 and a fuel receiver mount 226. The fuel receiver mount 226 may be threaded on an interior surface at an inlet 228 so that a fuel receiver (not depicted) may be coupled with the non-pressure valve 104 assembly. In the depicted embodiment, a lock ring 230 secures the fuel receiver mount 226 to the housing 202. Although the above described components are depicted as separate but joinable elements, in an alternative embodiment, the housing 202, entry cone 220, bulb 122, fuel receiver mount 226 and the lock ring 230 may be integrally formed.

Openings in the flow-through ring mount 222 are fluidly coupled with channels 232 in the flow-through ring mount. The channels 232 are coupled with a bypass channel 234 in the housing 202. The bypass channel 234 fluidly connects the openings in the flow-through ring mount 222 with the hose 112 (see FIG. 1) and the outer surface of the sliding sleeve 210 via a shutoff channel 236. A portion of the fuel flowing through the non-pressure valve 104 enters the openings in the flow-through ring mount 222 and flows through the bypass channel to the vent 110. When backpressure in the hose 112 occurs, the force of the backpressure, together with the spring 214, pushes on the shoulder 212, via the shutoff channel 236, and causes the sliding sleeve 210 to overcome the force of flowing fuel and slide to the closed position of FIG. 2. The sliding sleeve 210 then impedes the flow of fuel and the fuel nozzle shuts off.

Figure 3:
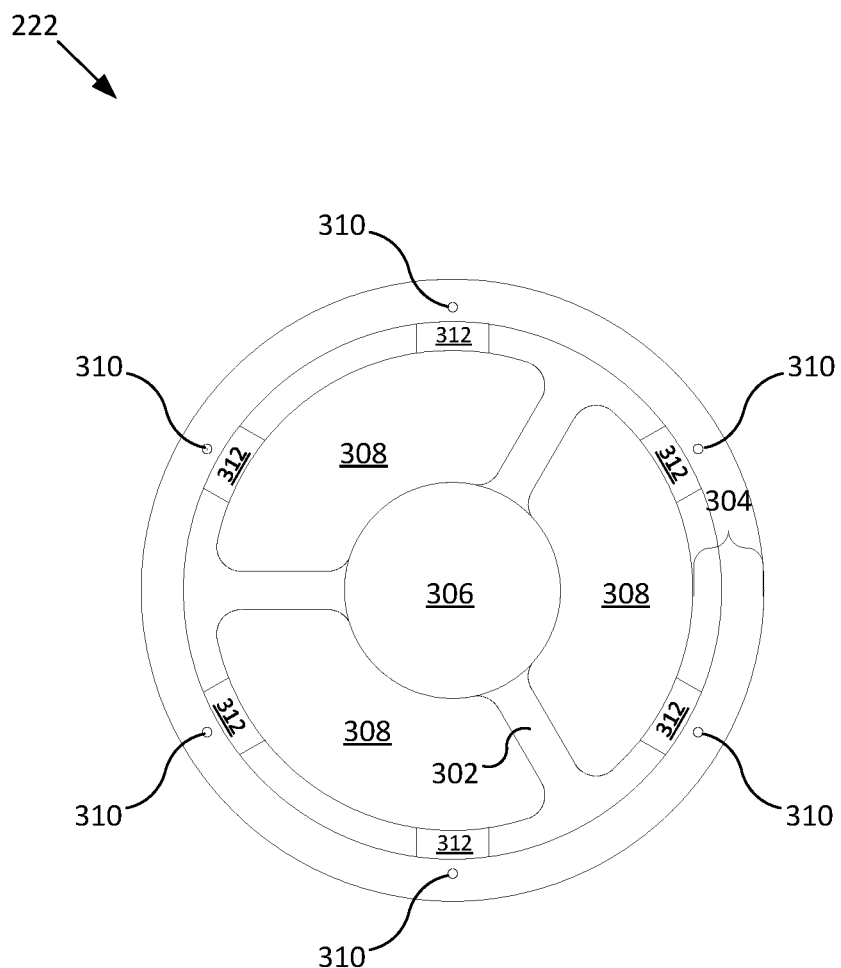
FIG. 3 is a schematic diagram illustrating one embodiment of the flow-through ring mount.

FIG. 3 is a schematic diagram illustrating one embodiment of the flow-through ring mount 222. In one embodiment, the flow-through ring (hereinafter "spider") mount 222 is formed as a circular mount having a diameter selected to mate with the interior surface of the housing 202. As depicted in FIGS. 2a and 2b, the spider mount 222 may include an O-ring that circumscribes the perimeter of the spider mount 222, and thereby forms a seal between the perimeter of the spider mount 222 and the housing 202. The spider mount 222, in one embodiment, is formed with legs 302 that extend inward radially from an outer region 304 to an inner region 306.

The inner region 306 is configured to support the bulb 122 and entry cone 220 in a position that aligns substantially with a center of the fuel flow path. As such, the flow path is substantially annular and flows through openings 308 in the spider mount 222.

The spider mount 222 may be formed with fuel bypass openings 310 in the outer region of the spider mount 222. The fuel bypass openings 310 may be positioned at equal radial distances from the center of the spider mount 222, or alternatively, at different radial distances. In one embodiment, each fuel bypass opening 310 is fluidly coupled with a corresponding channel (see FIG. 2a, element 232) which in turn is coupled with a bypass channel 234. In an alternative embodiment, each fuel bypass opening 310 may be fluidly coupled with a common channel that feeds into a common bypass channel 234.

In one embodiment, the fuel receiver mount 226 of FIGS. 2a and 2b abuts the outer region 304 and covers the bypass openings 310. Slits 312, or recesses in the spider mount 222 may be positioned adjacent the bypass openings 310 to allow for fuel to pass between the fuel receiver mount 226 and the spider mount 222 and enter the bypass openings 310. In another embodiment, the bypass openings 310 may be positioned in the legs 302, or alternatively, in the inner region 306.

Figure 4A:
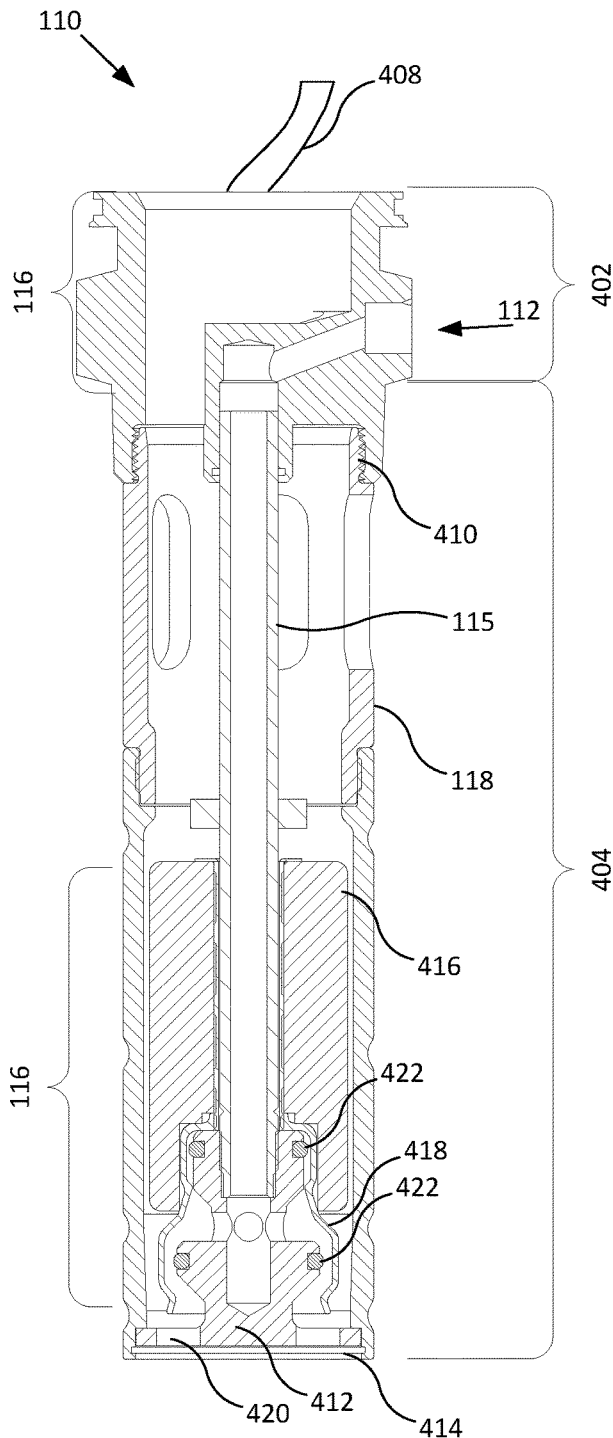
FIGS. 4a and 4b are side cross-sectional diagrams illustrating the vent in an open position (see FIG. 4a) and in a closed position (see FIG. 4b).
Figure 4B:
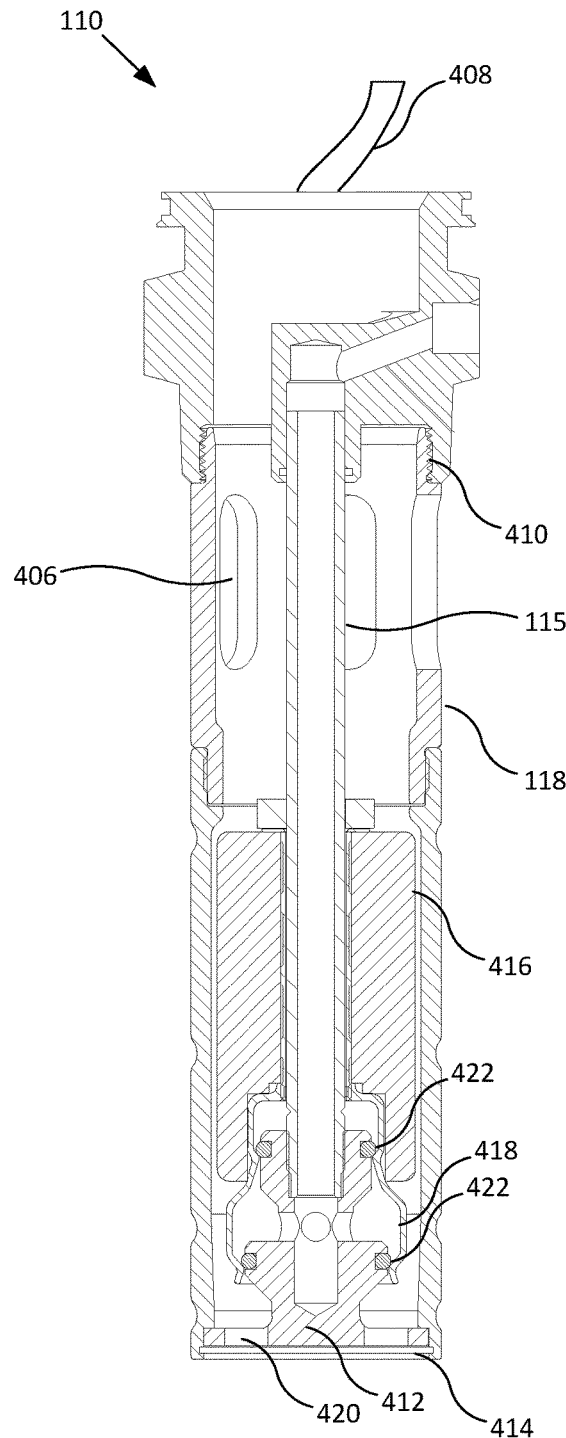

FIGS. 4a and 4b are side cross-sectional diagrams illustrating the vent 110 in an open position (see FIG. 4a) and in a closed position (see FIG. 4b). In the depicted embodiments, the vent 110 is formed, as described above with reference to FIG. 1, having an upper portion 402 positioned outside of the fuel tank, and a lower portion 404 positioned inside of the fuel tank. The upper portion 402 is fluidly connected with exhaust ports 406 built into the lower portion 404. Accordingly, as the fuel tank fills, air from the ullage area passes through the exhaust ports 406, into the upper portion 402, and into the atmosphere via a vent hose 408.

The lower portion 404, in one embodiment, includes a float shaft 118. The float shaft 118 is generally of a tubular configuration having a first opening that couples with the upper portion. As depicted, the float shaft 118 may be formed with a male threaded end 410 for attaching to a female threaded opening of the upper portion 402. Disposed within the float shaft 118 is the float tube 115. The float tube 115 is a tubular pipe with a first end fluidly coupled with the hose 112 at an upper end, and fluidly coupled with a poppet 412. The poppet 412 is disposed in the lower end of the float shaft 118, and may be secured with a spiral lock 414.

The float tube 115 slidably engages the float assembly 116. In one embodiment, the float assembly 116 includes a float 416 and a bell housing 418 coupled to one end of the float 416. The float assembly 116 is configured to move freely with respect to the float tube 115. In a default, or "open position" as depicted in FIG. 4a, the float assembly 116 rests on a bell guide 420. Fuel flows down the float tube 115, into the poppet 412, through a void between the bell housing 418 and the poppet 412, and into the fuel tank via openings in the bell guide.

The poppet 412, in one embodiment, is formed with O-rings 422 for forming a seal between the poppet 412 and the bell housing 418 when in "closed position" (see FIG. 4b). The void, or space between the poppet 412 and the bell housing 418 is selected to allow the free flow of fuel from the hose 112. In one embodiment, the flow rate of the hose is in the range of between about 1 and 3 gallons per second, when the distance between the poppet 412 and the bell housing 418, at the narrowest point, is in the range of between about 0.05 and 0.5 inches and the diameter of the poppet 412 is in the range of between about 0.5 and 2 inches.

Once the fuel in the fuel tank rises to a level where the float 416 begins to rise, the distance between the widest portion of the poppet 412 and the bell housing 418 begins to narrow. Accordingly, the fuel flow begins to be impeded, and the pressure of the fuel begins to increase and push upward on the bell housing 418. Almost instantaneously, the bell housing 418 transitions to the closed position depicted in FIG. 4b, and fuel flowing through the float tube 115 is stopped. As described above, the backpressure that results is communicated with the non-pressure valve described above with reference to FIGS. 2a and 2b, and the non-pressure valve shuts off the fuel flow.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

Furthermore, the details, including the features, structures, or characteristics, of the subject matter described herein may be combined in any suitable manner in one or more embodiments. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-pressure valve comprising:
a tubular housing having an inlet and an outlet;
a sliding sleeve coupled with the outlet, where an interior surface of the sliding sleeve and the tubular housing together form a fluid flow path, where the sliding sleeve slides on an interior surface of the outlet, and relative to the outlet, between a closed position and an open position;
a spring disposed between the sliding sleeve and the tubular housing;
a flow-through mount disposed within the tubular housing adjacent the sliding sleeve, wherein the flow-through mount is coupled with a bulb, the bulb configured to engage the sliding sleeve and impede a flow of fuel;
a hose fluidly coupling the non-pressure valve with a remote fuel vent; and
wherein the flow-through mount comprises a plurality of bypass openings configured to divert a portion of the fuel flow through the hose to the remote fuel vent regardless of whether the sliding sleeve is in either the closed position or the open position.

2. The non-pressure valve of claim 1, where the bulb is coupled with a hydrodynamically optimized entry cone.

3. The non-pressure valve of claim 1, where the sliding sleeve comprises a shoulder configured to engage a cutout portion of the tubular housing when the sliding sleeve is in the open position.

4. The non-pressure valve of claim 1, where the sliding sleeve slides from the open position to the closed position in response to an increase in backpressure in the hose.

5. The non-pressure valve of claim 4, where the backpressure in the hose causes a fluid to exert a force on a shoulder of the sliding sleeve and start a transition from the open position to the closed position.

6. The non-pressure valve of claim 1, further comprising a fluid receiver mount configured for receiving a fluid receiver that is configured to couple with a fluid nozzle.

7. The non-pressure valve of claim 6, where each of the plurality of bypass openings is positioned at an equal radial distance from a center of the flow-through mount.

8. The non-pressure valve of claim 1, further comprising a shutoff channel fluidly coupling at least one of the plurality of bypass openings with a cavity formed by a shoulder of the sliding sleeve and the tubular housing.

* * * * *